(12) United States Patent
Chehovits et al.

(10) Patent No.: US 9,919,854 B2
(45) Date of Patent: Mar. 20, 2018

(54) DURABLE, CONSUMABLE PACKAGING SYSTEM FOR HOT MELT MATERIALS AND METHODS OF MAKING AND USING SAME

(71) Applicant: Crafco, Incorporated, Chandler, AZ (US)

(72) Inventors: Jim Chehovits, Mesa, AZ (US); Todd Glover, Chandler, AZ (US)

(73) Assignee: Crafco, Incorporated, Chandler, AZ (US)

( * ) Notice: Subject to any disclaimer, the term of this patent is extended or adjusted under 35 U.S.C. 154(b) by 1003 days.

(21) Appl. No.: 13/627,701

(22) Filed: Sep. 26, 2012

(65) Prior Publication Data

US 2013/0075298 A1 Mar. 28, 2013

Related U.S. Application Data

(60) Provisional application No. 61/539,300, filed on Sep. 26, 2011.

(51) Int. Cl.
*B65D 65/46* (2006.01)
*B65B 29/00* (2006.01)
(Continued)

(52) U.S. Cl.
CPC .............. *B65D 65/46* (2013.01); *B65B 29/00* (2013.01); *B65B 63/08* (2013.01); *B65D 85/70* (2013.01);
(Continued)

(58) Field of Classification Search
None
See application file for complete search history.

(56) References Cited

U.S. PATENT DOCUMENTS

| 3,227,664 A | 1/1966 | Blades et al. |
| 3,366,233 A * | 1/1968 | Roediger ............... B32B 27/00 206/524.2 |

(Continued)

FOREIGN PATENT DOCUMENTS

| CN | 1190426 A | 8/1998 |
| CN | 1323271 A | 11/2001 |

(Continued)

OTHER PUBLICATIONS

Fields Product Information Sheet, 1999, 2 pages.
(Continued)

*Primary Examiner* — Jeffrey Wollschlager
(74) *Attorney, Agent, or Firm* — Patterson Thuente Pedersen, P.A.

(57) ABSTRACT

Durable consumable packaging systems for hot melt materials, and particularly asphalt. The packaging system can include an asphalt or asphalt composition contained within a durable consumable wrap or bag without the need for an outer protective container. The durable consumable wrap or bag comprises a woven or non-woven fiber based material, and particularly a spun-bonded olefin material, the olefin material comprising a high density polyethylene (HDPE) material. The durable consumable packaging system provides a simple, cost effective solution to a number of the problems associated with the prior art packaging containers and systems described above, while providing additional benefits to overcome the problems specific with the packaging and transport of asphalt.

8 Claims, 4 Drawing Sheets

(51) Int. Cl.
  B65D 63/08 (2006.01)
  B65D 85/00 (2006.01)
  B65B 63/08 (2006.01)
  *B29C 63/00* (2006.01)
  *B29C 39/00* (2006.01)
  *B29C 33/68* (2006.01)
  *B29C 39/02* (2006.01)
  *B29C 33/56* (2006.01)
  *B29C 63/02* (2006.01)
  *B32B 11/10* (2006.01)

(52) U.S. Cl.
  CPC .............. *B29C 33/56* (2013.01); *B29C 33/68* (2013.01); *B29C 39/003* (2013.01); *B29C 39/02* (2013.01); *B29C 63/0017* (2013.01); *B29C 63/02* (2013.01); *B32B 11/10* (2013.01)

(56) References Cited

U.S. PATENT DOCUMENTS

| | | | |
|---|---|---|---|
| 3,837,778 A | 9/1974 | Parker | |
| 4,137,692 A * | 2/1979 | Levy | B65B 63/08 53/440 |
| 4,207,937 A * | 6/1980 | Sandeman | B65D 88/1681 383/117 |
| 4,318,475 A | 3/1982 | Robinson | |
| 4,459,157 A | 7/1984 | Koons | |
| 4,460,728 A * | 7/1984 | Schmidt, Jr. | C09J 123/08 428/913 |
| 4,568,723 A | 2/1986 | Lu | |
| 5,292,468 A * | 3/1994 | Colombani | B29C 33/58 156/167 |
| 5,401,455 A * | 3/1995 | Hatfield | B65B 63/08 264/255 |
| 5,452,800 A | 9/1995 | Muir | |
| 5,509,255 A * | 4/1996 | Rutledge | B65D 77/04 206/522 |
| 5,733,616 A | 3/1998 | Janicki et al. | |
| RE36,177 E * | 4/1999 | Rouyer | B29B 13/022 206/447 |
| 6,451,394 B1 * | 9/2002 | Marzari | B65B 63/08 206/447 |
| 8,017,681 B2 | 9/2011 | Guymon et al. | |
| 8,088,845 B2 * | 1/2012 | Le Clerc | C08K 5/01 524/68 |
| 2002/0004351 A1 * | 1/2002 | Nobbee | D01D 5/11 442/394 |
| 2004/0020159 A1 | 2/2004 | Nelson et al. | |
| 2004/0248492 A1 | 12/2004 | Baker | |
| 2008/0296195 A1 * | 12/2008 | Suarez | B65D 88/1618 206/524.1 |
| 2010/0056669 A1 * | 3/2010 | Bailey | C08L 95/00 523/201 |
| 2010/0252476 A1 * | 10/2010 | Kreger | B65D 85/70 206/524.6 |
| 2010/0254636 A1 * | 10/2010 | Elkhouli | B65D 31/02 383/102 |
| 2010/0311875 A1 * | 12/2010 | Le Clerc | C08K 5/01 524/62 |
| 2011/0233105 A1 * | 9/2011 | Bailey | C09D 195/00 206/525 |
| 2016/0060010 A1 | 3/2016 | Chehovits et al. | |

FOREIGN PATENT DOCUMENTS

| | | |
|---|---|---|
| CN | 2550286 Y | 5/2003 |
| CN | 101412829 | 4/2009 |
| CN | 101691434 A | 4/2010 |
| CN | 101979440 A | 2/2011 |
| EP | 0911277 * | 4/1999 |
| WO | WO2008138859 * | 11/2008 |
| WO | WO 2009/096917 A1 | 8/2009 |

OTHER PUBLICATIONS

Chengdu Qida Science and Technology Development Co., Ltd. Product Information, 1999-2013, 5 pages.
Product Handbook for DuPont™ Tyvek®, May 2002, 28 pages.
Office Action dated Sep. 7, 2015 for Chinese Application No. 201210364578.6, 14 pages.
Office Action dated Dec. 17, 2014 for Chinese Application No. 201210364578.6 filed Sep. 26, 2012, 15 pages.
Application and File history for U.S. Appl. No. 14/938,031, filed Nov. 11, 2015. Inventors: Chehovits et al.
Office Action dated Apr. 20, 2016 for Chinese Application No. 201210364578.6, 13 pages.

* cited by examiner

DURABLE, CONSUMABLE PACKAGING SYSTEM FOR HOT MELT MATERIALS AND METHODS OF MAKING AND USING SAME

RELATED APPLICATION

The present application claims the benefit of U.S. Provisional Application No. 61/539,300 filed Sep. 26, 2011, which is incorporated herein in its entirety by reference.

FIELD OF THE INVENTION

This invention relates to packaging, and more particularly to special durable and meltable packaging for hot melt materials such as asphalt and asphalt compositions.

BACKGROUND OF THE INVENTION

Asphalt, also known as bitumen, is sticky, black and highly viscous liquid or semi-solid present in most crude petroleums and in some natural deposits. Asphalt is composed primarily of a mixture of highly condensed polycyclic aromatic hydrocarbons, and is classed as a "pitch" or a viscoelastic, solid polymer.

Asphalt is a thermoplastic material that softens as it warms, and stiffens as it cools. Asphalt has both adhesive and waterproofing characteristics, making it useful in a variety of applications including paving, waterproofing, roofing and others. Asphalt is available in a wide range of stiffnesses for various uses, and is also commonly modified or compounded with various additives to enhance properties for certain uses. Asphalt that must be heated to lower the viscosity for installation is referred to as hot applied asphalt. Asphalt is also commonly processed with solvents or emulsified to make it into a liquid composition that can be applied with little or no heat, and then cures after application. These are normally referred to as "cold applied" asphalts. "Hot applied" type asphalts are normally supplied to the user in two manners depending on the type of use. For large use volumes such as for pavement construction, asphalt is usually supplied hot and fluid in a large capacity bulk truckload type tank which can range up to 6000 gallons, for example. For many others uses such as roofing, waterproofing, and crack or joint sealing, smaller volumes are used and the asphalt is usually supplied as a solid at ambient temperature in packages, generally weighing from approximately 20 up to 100 pounds (lbs), and a required amount for the particular application is heated to a desired use temperature at the jobsite.

Because asphalt does not go through a solid-liquid phase change when heated, it does not have a true melting point. Rather, as the temperature is raised, asphalt gradually softens or becomes less viscous. Asphalt is produced in several standard types with different stiffness for certain applications. For example, ASTM D312 is the "Standard Specification for Asphalt Used in Roofing," incorporated herein by reference in its entirety. ASTM D312 was originally published in 1929, and covers four different stiffness grades. ASTM D449 is the "Standard Specification for Asphalt used in Dampproofing and Waterproofing," incorporated herein by reference in its entirety. ASTM D449 was published in 1937, and covers three different stiffness grades.

Over the last 60 or so years, there have been several types of specifications used for paving asphalts. ASTM D946 was originally published in 1947, and is the "Standard Specification for Penetration-Graded Asphalt Cement for Use in Pavement Construction," incorporated herein by reference in its entirety, and includes five grades based on penetration testing at 77° F. ASTM D3381 is the "Standard Specification for Viscosity Graded Asphalt Cement for Use in Pavement Construction," incorporated herein by reference in its entirety. ASTM D3381 was originally published in 1975, and covers 11 different viscosity grades for use in different temperature areas.

The most recent specification for paving asphalt is ASTM D6373, entitled "Standard Specification for Performance Graded Asphalt Binder," incorporated herein by reference in its entirety. ASTM D6363 was published in 1999, and covers 37 different grades based on specific properties suited for varying climates temperature ranges.

There are also many different specifications for modified asphalt compositions for various uses including ASTM D6154 for Chemically Modified Asphalt, ASTM D6626 for Trinidad Lake Asphalt, ASTM D6114 for Asphalt Rubber Binder, ASTM D6297 for Asphaltic Plug Joints for Bridges, ASTM D3141 for Asphalt for Undersealing Portland Cement Concrete Pavements, ASTM D5078 for Crack Filler, Hot Applied, for Asphalt Concrete and Portland Cement Concrete Pavements, ASTM D6690 for Joint and Crack Sealants for Concrete and Asphalt Pavements, ASTM D5710 for Trinidad Lake Modified Asphalt, all of which are incorporated by reference in their entireties, and many others.

The stiffness characteristics of the many different types of asphalts and modified asphalts vary widely depending on climate and use. Two types of properties that can be used to classify stiffness of asphalts are penetration and softening point. Penetration can be measured by the ASTM D5 penetration test, entitled "Standard Test Method for Penetration of Bituminous Materials" and incorporated herein by reference in its entirety. This test measures the depth that a specific needle under controlled conditions penetrates into a prepared specimen of asphalt. Low penetration results, such as less than approximately 25, indicate stiffer, more flow resistant materials, and higher results over 25 indicate softer materials that can experience cold flow at ambient temperatures.

Softening point can be measured by the ASTM D36 ring and ball softening point test, entitled "Standard Test Method for Softening Point of Bitumen (Ring-and-Ball Apparatus)" and incorporated herein by reference in its entirety. This test indicates the temperature that a specific ball falls through a prepared sample of the asphalt while heating under controlled conditions. High softening point results, such as approximately 210° F. or more, indicate stiffer materials that may resist flow at ambient temperatures, while lower results, under 210° F., indicate materials that will experience cold flow.

To be able to be classified as flow resistant at ambient temperatures, asphalt materials need to be both high softening point and low penetration. The stiffest most flow-resistant standard asphalt type is ASTM D312 Type IV Roofing Asphalt, characterized with a Ring and Ball Softening Point range of 210 to 225 F, and a Penetration range of 12 to 25. This stiffness range of asphalt is generally characterized as being very flow resistant at normal roof exposure temperatures, and so stiff, that at normal storage temperatures in packages it is also very cold flow resistant. Packages for this very stiff, cold flow resistant asphalt needs to be strong enough to be able to contain the asphalt after it is poured into them while it cools, but since the asphalt is so stiff and cold flow resistant after cooling, support strength from the package is generally not needed, except that the packaging mainly assures that the blocks do not adhere together during storage and transport, and is easily useable at the job site.

There are many asphalt and modified asphalt types that are high softening point, but also high penetration, that experience cold flow. Most other asphalt types that have lower softening points and higher penetrations than the Type IV Roofing Asphalt, can experience cold flow at ambient storage temperatures, and if supplied in a packaged form, must be contained in a durable package for storage, shipping and handling at the jobsite. Some of the softest asphalt types are for paving and include ASTM D946 85-100, 120-150, and 200-300 grades, with penetration ranging from 85 to 300 at 77° F., and ASTM D 3381 AC-2.5, AC-5 and AC-10 with penetration ranging from 70 minimum to 200 minimum.

Asphalt meeting ASTM D6373 PG (penetration grade) 46, 52 and 58 Grades is also very soft, but standard properties are not measured using penetration. Typical penetration results for these PG grades are from 80 to over 200. The Ring and Ball Softening Point of these soft grades is generally less than 130° F. These asphalts are normally supplied in hot bulk truckloads, and if packaged will experience cold flow. Modified asphalt sealants meeting requirements of ASTM D5078 and D6690 generally have penetration ranges from 70 or 90 maximum to 150 maximum, and softening points from 150 F to approximately 200 F, and experience cold flow at ambient temperatures.

For the sake of simplicity and clarity, these asphalts, i.e. asphalts having a low or high softening point coupled with high penetration, such as above 25, and that can experience cold flow, will be referred to throughout the specification as "cold flowable asphalts."

It is common practice to place molten asphalt or molten asphalt compositions in packaging such as containers at a manufacturing facility and ship a desired quantity to a job site on an as needed and when needed basis. When the asphalt is needed at a job site, the containers are torn open and the asphalt, which has since cooled and thus, solidified, is placed in a heating vessel such a tank to reheat the asphalt. When the desired temperature of the molten asphalt is reached, normally in a range of about 300° F.-400° F., it is applied in accordance with procedures suitable for the particular job.

Molten asphalt can be a difficult material to handle due to inherent characteristics of the material itself which makes containerization and transport of the molten asphalt a slow, messy and relatively costly operation if the container does not have adequate durability, strength, or integrity to contain the asphalt within. Specifically, asphalt is initially molten or at least flowable during containerization of the material, and is subsequently cooled to solidify the asphalt for storage and transport. However, asphalt does not necessarily remain solid until use, and can become flowable (i.e. cold flow) during storage and transport, before finally being melted to a molten state for use at the job site, creating various challenges in storage and transport.

Known packaging system have attempted to address the many issues tied to each stage of containerization, storage, and transport of asphalts, and particularly cold flowable asphalts. However, these known packaging systems either fail to adequately address all issues, or create new issues during the process of solving other issues.

First, softer grades of molten asphalt can be pumped at temperatures as low as about 200° F.; however, it is very viscous at such low temperatures which makes the pumping thereof a slow process. At higher temperatures, the molten asphalt will inherently become less viscous and thus is easier on the pumps and otherwise makes the filling of the containers a faster, easier, and less costly operation. However, at the elevated temperatures at which the molten asphalt will more easily flow, such elevated temperatures can destroy certain containers that do not have sufficient integrity at such temperatures. It will be seen from the above that a limiting factor in the prior art asphalt containerization process is the container itself which requires that the asphalt be cooled to temperatures low enough, depending on the packaging type, so that it will not destroy or degrade the containers, or, alternatively, require special container design that withstands these elevated temperatures, i.e. maintains container durability and integrity at such temperatures for extended periods of time.

Another characteristic of the asphalt which must be considered in all containerization processes is that asphalt will adhere to virtually anything and upon cooling will form a very tenacious bond with the contacted item. This inherent characteristic of asphalt has dictated the basic design parameters of the containers used since the beginning of this type of containerization.

A traditional container for asphalt products, and specifically sealants, includes a metal pail lined with a polymeric liner bag or pail. These metal pails can range from five gallon pails to 55 gallon metal drums. However, due to the increased cost of steel to make the pails or drums, the container tends to be expensive. Furthermore, once the asphalt has been removed from the container, the pail or drum then creates waste product that needs to be removed from the job site. Finally, the drums or pails are relatively heavy, which can result in increased cost of transportation and storage, because, for example, a limited number of drums or pails can be transported or stored in a single load due to weight restrictions.

A modification of the steel drum container is a cardboard keg, such as a two foot by thirteen inch diameter keg, and typically includes a release coating on the inside of the keg so that the asphalt can be readily removed. Although this container is significantly lighter and less expensive than the steel drum or pail container, it similarly suffers from the drawback of generating waste product at the job site. Additionally, if the cardboard is not completely removed, it can cause contamination of the asphalt, and/or melting difficulties, such as clogging of plugging of the melting equipment. Furthermore, this container is typically limited to the containerization of stiffer or flow resistant asphalts, such as roofing asphalt, as it may not have sufficient durability for containing, storing, and transporting some types of cold flowable asphalts.

One conventional container system for asphalt that attempts to address the containerization and storage and transport issues includes a corrugated cardboard carton or box into which a bag is inserted as a liner. The liner bag is formed of a synthetic plastic material having a wall thickness such as, for example, of about 0.001 to about 0.006 inches (1 to 6 mils). The plastic material can comprise polypropylene which is capable of withstanding temperatures of up to a maximum of about 275° F., and will melt at or somewhat higher than that temperature, such as at about 325° F. During containerization, a liner bag is typically placed in the carton or box, and then heated or molten asphalt is pumped, poured, or otherwise placed into the bag, the heated asphalt being at a temperature lower than melting point of the plastic of the liner bag. The outer cartons or boxes are necessary to provide stacking stability and durability of the packaging for transport of the asphalt or asphalt composition, particularly when used for cold flowable asphalts.

However, this packaging, well suitable for containerization and stackability purposes creates other issues or problems, especially during transport and storage. Even after the asphalt has cooled and solidified, increased pressure and temperature from the stacking of materials as well as fluctuations in temperature during storage and/or transport can cause the asphalt composition to flow. The outer protective cartons or boxes provide the necessary stacking stability to accommodate for this flow. However, the structural integrity of the boxes can be compromised in a number of ways during storage and transport. For example, if the cardboard boxes are exposed to water, the structural integrity of the cardboard boxes is compromised, thereby comprising the internal liner or bag filled with asphalt. Similarly, if the box is punctured or ripped during storage or transport, the structural integrity of the cardboard box is compromised, as well as the internal liner or bag filled with asphalt. The flow of the asphalt coupled with damage to the packaging during storage or transport can result in breached packaging. A breached box with leaking product not only makes a mess in the storage facility or transport vehicle, but results in unusable product because the asphalt adheres to other boxes, making it impossible to remove the cardboard from the asphalt. The asphalt is then unusable because it cannot be placed in a heating vessel or melter, because contamination of the cardboard can clog the heating vessel. Furthermore, if the box is weakened by getting wet or otherwise damaged, the box can become unstable causing an entire pallet of material to slump, and even leak. Any of these scenarios costs both time and money to replace unusable product and in restacking and clean-up.

When the molten asphalt is pumped into the plastic liner bags during containerization it will adhere thereto which makes subsequent removal difficult if not impossible to accomplish. Therefore, when readying the containerized asphalt for use at a job site, it is a common practice to tear open the carton, remove the plastic liner bag having the solidified asphalt therein and place it, liner bag and all, in the vessel which is to be used to heat the asphalt. Due to the nature of the plastic material, and because the mass of the plastic is small in comparison to the mass of the asphalt, the plastic does not appreciably affect the integrity of the asphalt. This common practice places further design parameters on the nature and characteristics of the plastic liner in addition to its being capable of withstanding the hereinbefore described containerization temperatures. These further considerations are that the liner bag ideally should be as thin as possible, and should melt readily at asphalt reheat temperatures in a range of about 300° F.-400° F. which is an ideal temperature at which the molten asphalt will, for example, properly flow into cracks and expansion joints in paved surfaces.

Another problem with this packaging system is that once the liner with asphalt has been removed, discarded boxes are generated, causing handling and disposal issue out on the job site. For example, the emptied boxes create increased construction waste product. Furthermore, if there are not adequate facilities closely available to dispose of or store the emptied boxes, the boxes must then be transported to such facility to dispose of or store the boxes, which consumes valuable time and costs money.

Another example of a packaging system similar to the corrugated cardboard carton is a multilayered flexible bag and liner assembly. An inner liner bag is formed of a synthetic plastic material, such as low density polyethylene, having a wall thickness such as, for example, of about 0.002 to about 0.010 inches (about 2-10 mils). A number of layers are then layered on the liner bag including a first inner layer of kraft paper of about 4 mils thick, an intermediate layer of a nonwoven film such as a spun bonded, heat sealed fabric of about 9 mils thick which is similar to a very light piece of fabric of about 3 ounces per square yard in weight, and another, outer layer of kraft paper of about 4 mils thick. The inner layer of kraft paper can also include a release coating on an inner surface to ensure that the liner bag does not stick thereto in the event of a liner bag breach.

In use, the multilayered package is filled with molten or heated asphalt heated to a temperature below the melting temperature of the liner bag. The multilayered package is then stitched closed. Multiple outer layers over the liner bag are necessary to provide stacking stability and durability of the packaging for transport of the asphalt or asphalt composition, particularly when used for cold flowable asphalts.

When readying the bagged asphalt for use at a job site, it is a common practice to tear open the outer layers to remove the plastic liner bag having the solidified asphalt therein and place it, liner bag and all, in the vessel which is to be used to heat the asphalt. Due to the nature of the plastic material, and because the mass of the plastic is small in comparison to the mass of the asphalt, the plastic does not appreciably affect the integrity of the asphalt.

Although this multilayered bag system provides a tough, durable, and strong puncture resistant packaging solution, it is expensive due to the many layers needed to provide adequate strength and durability. Furthermore, because the outer layers need to be removed before use, it creates increased waste product at the job site, similar to the cardboard box system. Finally, if the outer layers are not entirely removed, it can contaminate the asphalt, thereby rendering the asphalt unusable, or cause clogging or plugging of the heating vessel.

A container and method has recently been developed to address the issues described above with respect to the box and liner system. In particular, a way to reduce waste generation at jobs sites stems from the development of containers for asphalt that include an entirely consumable container. One such container is disclosed in U.S. Pat. No. 8,017,681 to Guymon et al. The container is a non-asphalt, thermoplastic, waterproof container made of an expanded polymer, such as Styrofoam®. The container can be in the shape of stacking blocks. At the job site, the entire container having the solidified asphalt therein is placed in the vessel which is to be used to heat the asphalt.

Another example of an entirely consumable container system can be found in U.S. Pat. No. 5,733,616 to Janicki et al. The container is molded from a composition comprising 40 to 90 weight percent of an asphalt and 10 to 60 weight percent of a polymer material, such as a blend of polypropylene (PP) to impart heat resistance, and ethylene vinyl acetate (EVA) to impart toughness and impact resistance. The container is entirely consumable and can be melted along with roofing asphalt held in the container.

However, these packaging options can cause logistics and handling issues during manufacturing. For example, because of the material used for the container, the asphalt is poured into the containers at a lower temperature than the melting temperature of the bag and box packaging described above so as not to melt the container. These types of containers can be significantly more expensive than the conventional box and liner packaging described above as careful design of materials is needed to obtain a container having adequate integrity to hold shape when molten asphalt is poured directly into it.

Another problem with the expanded polymer container is that the packing density is significantly reduced because the expanded polymer containers are not able to be nested causing storage and handling issues. For example, approximately 20,000 to 25,000 boxes of the boxes and liner configuration can fit on a single semitrailer, whereas only approximately 4,000 of the expanded polymer containers can fit on the semitrailer. Similarly, the expanded polymer containers require significantly more storage space than the boxes for the same amount of asphalt.

Furthermore, these consumable packaging systems may be prone to leakage when stacked, particularly when used in combination with cold flowable asphalts. For example, the packaging system of Janicki et al. does not include a lid and is heavy enough that when the containers are stacked, the load due to the weight of the stacked containers can cause the asphalt composition in the bottom or lower layer containers to flow, which can in turn, collapse under the weight, and/or the asphalt is forced out of the container. Therefore, the applications for these containers may be limited to higher softening point asphalts, such as roofing asphalts having a penetration grade of about 25 or less, and softening points of approximately 210° F. or more.

Another problem with the packaging system of Guymon et al, for example, is that it requires a separate lid. The lids are prone to unwanted removal, such as by wind, transport, and the like, causing unwanted waste product. Additional components and/or manufacturing steps may be needed to secure the lid to the container, thereby increasing the cost of the packaging system. The lid can also compromise the otherwise water-tight design. The lack of a water-tight seal may cause potentially significant hazards during use as any water in the container can cause eruptions when melted, and ultimately unwanted boil over at the job site.

Finally, the consumable container of these packaging systems is a significant portion of the total weight of the packaging system, e.g. about 1.5 weight percent or more, such that the container material can be detrimental to the integrity of asphalt composition. For example, the increased plastic content may negatively affect the melt and/or setting properties of the asphalt, and/or the container may not completely melt causing contamination of the asphalt, potentially rendering it unusable. Furthermore, some of the so-called meltable containers do not completely melt, causing build-up of residue and even plugging of the melting unit or heating vessel.

Another packaging system that attempts to resolve many of the problems described above includes a film-only wrap or envelope. For example, U.S. Pat. No. 3,837,778 to Parker discloses a thermoplastic resin film for use as roofing asphalt packaging. Specifically, Parker discloses that a polyester resin film is preferred, and that polyethylene and saran resins have been found to be unsatisfactory (see, for example, Col. 6, lines 44-50). Furthermore, the films disclosed in Parker are limited to asphalts that have little tendency to cold flow. Specifically, Parker discloses that the film disclosed "does not produce satisfactory results with respect to low soft point asphalts as they are so fluid and cold flow so readily as to require totally impractical thickness of film." (Col. 6, lines 57-61)

Other examples of film packaging are found in U.S. Pat. No. 5,452,800 to Muir and U.S. Pat. No. 4,137,692 to Levy. Muir discloses a polypropylene film having a thickness from 1.0 to 1.8 mils with a melting point between 275° F. and 335° F. as the sole containment for blocks of roofing asphalt. However, this packaging system, due to the inherent characteristics of polypropylene at ambient temperatures and conditions, is limited to asphalts that have little tendency to cold flow, i.e. higher melting point roofing asphalts, and is not applicable to cold flowable asphalt materials. If used with cold flowable asphalts, the packaging would be compromised during handling and storage. Particularly, as the blocks are stacked, stored, and transported, the asphalt can soften and flow, and the polypropylene packaging alone lacks sufficient strength to prevent the asphalt from breaching the package when stacked. Alternatively, to achieve adequate strength, the film thickness required would be so great that it would be more difficult to melt and could potentially influence properties of the asphalt.

Similarly, U.S. Pat. No. 4,137,692 to Levy discloses a polyethylene biaxially-oriented stretched and heat-shrinkable film. However, this film, without more, would suffer the same drawbacks as the film of Levy if used with cold flowable asphalts.

U.S. Pat. No. 3,366,233 to Roediger discloses an entirely consumable package for paving asphalt comprising a multilayered or laminated container or encasement of sheeting or film, composed of polyethylene, polypropylene or a copolymer of ethylene and polypropylene. The thickness of the film ranges from about 2 to about 6 mils. As shown in some of the Examples, single walled films had moderate to severe oil transfer and tackiness, as well as unsatisfactory to marginal package suitability. Furthermore, the Examples set forth that the bags were stored for a period of 70 days at a temperature of 150° F., and under loading conditions equivalent to the bottom bag of a four bag high stack (about 10 pounds per square foot or about 0.07 pounds per square inch). These conditions are significantly less than typical pallet storage and transport conditions. In commercial use, pallets are typically stacked six to eight packages high, and are of a weight such that the bottom bag is subjected to loads of about 1.2 pounds per square inch (172 pounds per square foot). It is highly unlikely, although unknown, that the packages of Roediger would have similar durability and integrity results when at these higher load conditions when used to package cold flowable asphalts.

Therefore, a need exists for a new and improved container or packaging solution for asphalt and asphalt compositions, and particularly cold flowable asphalts, which not only overcomes the problems associated with the packaging and transporting of asphalt and other hot melt materials, but also overcomes the shortcomings of the prior art, the shortcomings including one or more of lack of adequate consumability and meltability of the container, lack of adequate packaging integrity during stacking, storing, and transporting, the need for additional non-consumable materials to provide adequate packaging integrity thereby creating job site waste product, uneconomical or economically unrealistic, and manufacturing infeasibility or difficulty.

SUMMARY OF THE INVENTION

Durable packaging systems for hot melt materials, and particularly asphalt, according to embodiments of the invention, overcome a number of the problems associated with the prior art packaging containers and systems described above, while providing additional benefits to overcome the problems specific with the packaging and transport of asphalt.

Specifically, the durable packaging system: (1) provides sufficient strength and durability, when combined with an asphalt composition, to reduce or prevent occurrences of packaging breach during storage or transport without the need of an outer protective container; (2) provides adequate stacking stability, when combined with the asphalt, to accommodate for asphalt flow without the need for an outer protective container; (3) is virtually waterproof; (4) is entirely and safely consumable at the job site even in the event of packaging breach; (5) is entirely meltable at standard asphalt reheating temperatures without significantly or detrimentally impacting the melting properties of the asphalt composition; (6) is easily printable using any of a variety of printing processes; (7) can be used in automated packaging processes, such as wrapping and filling, unlike the containers of the prior art; and (8) is more readily manufactured or more amenable to conventional manufacturing processes.

According to embodiments of the invention, the packaging system can include an asphalt or asphalt composition contained within a durable wrap or bag without the need for an outer protective container. The durable wrap or bag comprises a woven or nonwoven fibrous plastic type material. The packaging material provides essentially a fiber-reinforced, durable yet flexible, and meltable material having a thickness from about 0.001 inch to about 0.012 inch (about one to about twelve mils), and more particularly from about 0.003 inch to about 0.010 inch (about three to about ten mils), and even more particularly from about 0.005 to about 0.007 inch (about five to about seven mils).

In one specific embodiment of the invention, the material comprises a non-woven spun-bonded olefin material, such as a flash spun-bonded high density polyethylene (HDPE) material. The material comprises a plurality of non-directional fibers, or a three-dimensional film-fibril nonwoven network referred to as a "plexifilament." This network is created by first flash spinning (e.g. forcing a heated, pressured solution of polymer in a solvent into a spinneret where it is allowed to rapidly expand, thereby flashing off the solvent), and then bonded together by the application of heat and pressure. Such plexifilamentary material is commercially available as Tyvek® brand protective material from DuPont.

Alternatively, other materials can be utilized including other fiber or filament-reinforced nonwovens formed from mechanical, melt-blown, or other spun-bound processes using polyethylene or polypropylene, woven materials formed from polymeric materials including polyethylene or polypropylene, and the like, or combinations thereof.

The packaging material has a puncture resistance of about 50 pounds or greater, and more specifically about 85 pounds or greater, and yield strength of about 15 pounds or more, and more particularly about 18 pounds or more per lineal inch of width. In one embodiment, at least one of the puncture resistance and yield strength of the packaging material of a certain thickness is substantially similar to or greater than the puncture resistance or yield strength of a standard, non-fibours polymeric film having double the thickness.

The packaging material according to embodiments of the invention, and particularly the plexifilamentary material described above, can withstand tensions of up to about 2.6 N/lineal cm when at room temperature (77° F., 25° C.). The melting point is about 250 (begins to shrink) to about 300° F. and more particularly about 275° F. The material is inert to most acid, bases and salts, and has a neutral pH. The material has dimensional stability of less than 0.01% change between 0 and 100% relative humidity at constant temperature, and has low air permeability compared to most plastic films and similar to that of coated papers. Its flexural strength exceeds 20,000 cycles when tested on an MIT flex tester using TAPPI method T-423.

The plexifilamentary material is light weight, and has a density of about 0.30 to about 0.40 g/cc, and more particularly about 0.38 g/cc. It has superior moisture resistance and is equally strong or durable wet or dry. It has a hydrostatic head (liquid barrier protection) in excess of 50 inches without an antistatic agent, and with an antistatic agent, it is about 40-50 inches. A combination of corona treatment and antistatic agent gives the material a barrier protection or hydrostatic head of less than about 15 inches.

The plexifilamentary material has a GE Brightness of 94.1 (100 for perfect white; titanium dioxide pellet is about 93.8), and has high opacity due to the multiple light refractions from its fibrous nature, thereby having excellent reflective properties. It is UV resistant such that it can be kept outdoors for long periods of time, as well as solvent resistant, although some solvents can cause reversible swelling. Finally, it has excellent mold and mildew resistance.

The packaging material according to embodiments of the invention provides sufficient stability and durability at workable thicknesses such that the solidified packaged product, such as asphalt, or other sealants or hot melt materials, can be packaged within and stacked on each other without the need for an additional protective outer container or box. The plexifilamentary material provides sufficient durability such that it protects the asphalt from leaking from the package due to heat and/or pressure generated from the packaging and stacking processes. Furthermore, the material protects the asphalt from damage, such as holes, tearing, etc. due to transport and handling because the packaging has high degrees of tear or puncture resistance. However, even in the event of a packaging breach in which the asphalt leaks onto other packages, the other packages as well as the leaked asphalt is usable because the packaging is entirely consumable itself, and there is no contamination as is found in the box/outer bag and liner bag systems.

The packaging material is also waterproof, protecting the packaged hot melt material from unwanted moisture during storage and handling such that neither the package nor the asphalt are degraded or damaged. Unlike the packaging of the present invention, a wet cardboard box of the prior art packaging systems quickly losses its structural integrity when wet, causing the box to deform or yield under pressure, thereby comprising its stacking stability.

The packaging material also melts at relatively low temperatures, such as 250-275° F., such that it is readily meltable at the job site without requiring additional handling or heating processes. Upon melting, the material essentially "disappears" into the molten asphalt with no appreciable effect on the asphalt composition, including its melting properties. The melted packaging is virtually unnoticeable in the melted asphalt, and does not omit undesirable smoke or fumes.

The packaging system optionally includes a thin liner material (i.e. about two (2) mils or less) of a heat-sealable film, such as polyethylene, and specifically low density polyethylene (LDPE), that melts below the reheat temperature of the asphalt such that it is readily incorporated into the asphalt composition upon use. The thin liner provides heat-sealable properties to the package.

In one embodiment, to manufacture a packaging system for hot melt compositions, and specifically asphalt, molten or heated asphalt is cast, poured, or otherwise deposited into a suitable mold of desired size and shape, such as a rectangle cardboard or wooden mold, with one or more compartments. The mold is lined with a consumable, thin-walled polymeric bag, such as a polypropylene bag, that can withstand the elevated temperature of the asphalt, yet has a melting point below the reheat temperature of the asphalt. The asphalt composition is then cooled in the bag in the mold thereby taking the shape of the mold. Once the asphalt has cooled such that it is a substantially solid slab, the asphalt is subsequently wrapped and sealed, either manually or automatically, with the packaging material. Alternatively, the slabs of asphalt are sealed into pouches, containers, or bags formed from the packaging material. In yet another alternative embodiment, asphalt is heated to a temperature that allows the asphalt to flow, but is below the melting temperature of the packaging material, such that the asphalt can be poured or pumped directly into the bag or pouch, and subsequently sealed. After sealing, the package is allowed to cool, either using ambient conditions or other cooling processes.

The packages are then stacked without the need for an outer non-consumable protective container. Eliminating the outer container results in more dense packing of the asphalt material in storage or during transport. The cost per pound of the packaging systems is preferably similar to or less than the conventional box and liner packaging system, and significantly less than the consumable foam packaging system, both described in the Background section.

The stacked pallets of asphalt contained in the packaging material can optionally be secured by stretch wrapping or shrink wrapping. Additionally or alternatively, a strip or sheet of the packaging material can be wrapped around at least a portion of the stacked bags, such as around one or more of the bottom layers, thereby creating a reinforcing strip to prevent or reducing sagging or slumping of the stacked material. Although some deformation of the bags may be observed due to the inherent nature of the asphalt to flow under pressure and/or heat, the bags demonstrate sufficient stacking and handling stability.

The above summary of the invention is not intended to describe each illustrated embodiment or every implementation of the present invention. The figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
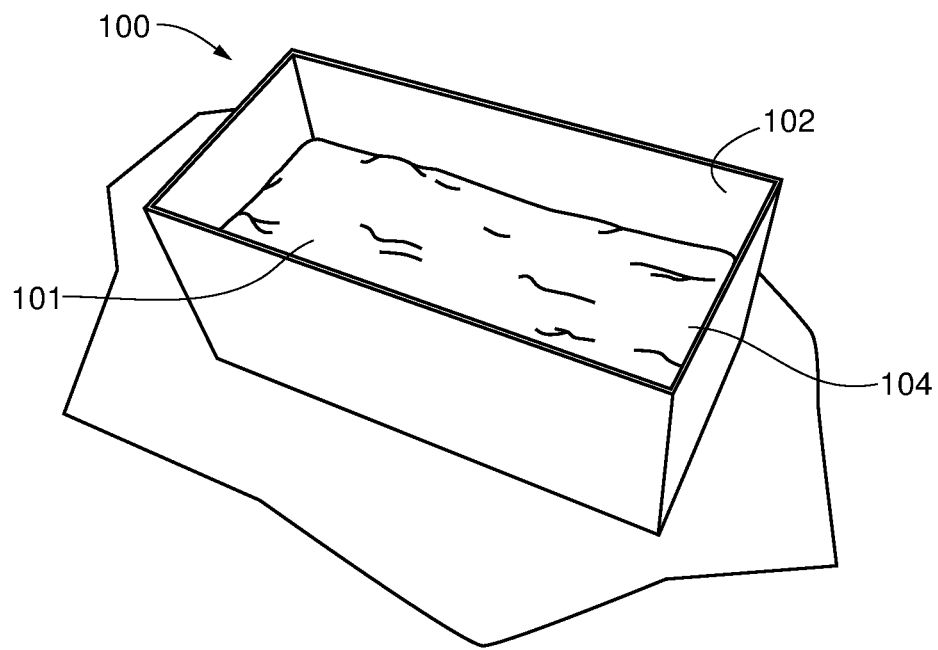
FIG. 1 is depicts a mold lined with a bag and a portion of asphalt within for casting asphalt slabs according to an embodiment of the invention.

While the invention is amenable to various modifications and alternative forms, specifics thereof have been shown by way of example in the drawings and will be described in detail. It should be understood, however, that the intention is not to limit the invention to the particular embodiments described but rather to include all modifications, equivalents, and alternatives.

DETAILED DESCRIPTION OF THE DRAWINGS

Embodiments of the invention provide a packaging system including a woven, or nonwoven fiber-based or fiber-reinforce material, and particularly a spun-bond olefin plexifilamentary packaging material, and a hot melt or asphalt composition wrapped, contained, encapsulated, sealed, or otherwise packaged within the packaging material. The durable, yet flexible, packaging material to provide a packaging system for hot melt compositions such as adhesives, sealants, patching compositions, and particularly cold flowable asphalts, i.e. those that have a tendency to cold flow as described above. The packaging system is entirely consumable, i.e. the packaging material is completely melted or incorporated into the asphalt or hot melt composition in use, without significantly affecting the melting properties or other characteristics of the asphalt composition, and without generating job site waste product.

In one embodiment of the invention, the asphalt or hot melt composition contained in the packaging material is a cold flowable composition, i.e. is a material that experiences cold flow, as indicated by a softening point of less than about 210° F., and a penetration grade above 25, such as between 25 and 300. However, one of ordinary skill in the art would recognize that the durable, yet flexible, packaging systems according to embodiments of the invention can also be used for packaging of hot melt compositions including asphalts and modified asphalts that do not tend to experience cold flow, for example, materials having a softening point above 210° F. and a penetration grade of less than 25, such as Type IV ASTM D 312 Roofing Asphalt.

In embodiments of the invention, the packaging material is durable to withstand either manual or automatic containerization of the hot melt composition, i.e. packaging of the material, and can also withstand subsequent transport and handling. The packaging material has an average thickness from about 0.001 inch to about 0.012 inch (about one to about twelve mils), and more particularly from about 0.003 inch to about 0.010 inch (about three to about ten mils), and even more particularly from about 0.005 to about 0.007 inch (about five to about seven mils). The packaging material provides stacking stability thereby eliminating the need for a non-consumable outer protective covering such as a container or box, or consumable or non-consumable thick, unwieldy or unworkable films. The packaging material is readily meltable in heating vessels for hot melt reheating without negatively impacting the hot melt composition or the melting and/or setting properties of the hot melt composition.

In one particular embodiment of the invention, the packaging system comprises a nonwoven, spun bonded olefin material or film, such as, for example, a plexifilamentary material formed from flash-spun high density polyethylene. Such material is commercially available as Tyvek® from DuPont, which has a weight of about 12.5 pounds per thousand square feet. Tyvek® is a suitable material because the thin filaments that make up the material give the material extraordinary strength and durability as compared to a standard polyethylene or polypropylene material or bag, yet melts readily and easily in a heating vessel at a job site. This is because the melting point is lower than traditional packaging materials, such as polypropylene liners or bags, and can range from about 250° F. to about 275° F. This is ideal particularly when the hot melt comprises asphalt because asphalt reheat temperatures are in the range of about 300° F. to about 400° F. Therefore, there is no need to increase the reheat temperature beyond standard conditions to ensure adequate melting of the packaging material.

In an alternative embodiment of the invention, the packaging material comprises a consumable, woven olefin material, such as a woven polypropylene or polyethylene material, having a thickness in the range as described for the Tyvek® material described above. One such example is commercially woven polypropylene material having a weight of 15.5 pounds per thousand square feet and a thickness of about 7.0 mils. Another example is commercially available woven polypropylene material that is about 1.6 oz per square yard, and about 0.004 to 0.005 inch (4-5 mils) in thickness. It has a tensile strength of about 35.0 kg of force per inch. The melting point of either of these polypropylene materials is around 325° F.

In another alternative embodiment of the invention, the packaging material comprises a nonwoven or spun bonded polypropylene material. In other embodiments of the invention, other nonwoven spun-bonded materials made from non flash-spinning process can be used, including polyethylene and polypropylene materials, so long as they provide adequate strength and durability for stacking, storing, and transporting of cold flowable hot melt materials, and have melting points at or below the reheating temperatures of the hot melt compositions which they contain.

For exemplary purposes only, the packaging material will be used interchangeably with plexifilamentary material. However, one of ordinary skill in the art would recognize that these other woven or nonwoven materials can be substituted for the flash spun-bounded plexifilamentary material. The plexifilamentary material can take any suitable shape, such as, for example, a pouch, a bag, a wrap, or the like.

The packaging system can optionally include a thin liner or polymeric material laminated, coated, or otherwise adhered to the plexifilamentary material. The plexifilamentary material can be extrusion-, adhesive-, flame-, ultrasonic-, and/or thermal-laminated with any of a variety of materials. In one particular embodiment, the laminate material comprises a polyethylene, such as a linear low density polyethylene film. A thickness of the laminate is about two mils or less. The laminate provides sufficient seal properties, such that the hot melt composition is stable in storage and handling and does not leak from the packaging. In one embodiment of the invention, the laminate is sealable to itself, such as by heat or ultrasonic sealing. In another embodiment of the invention, the laminate or coating is a cold seal material adhesive that bonds when exposed to pressure only (pressure-sensitive adhesive). In this embodiment, the seal is formulated so that tack to non-cold seal surfaces is minimized to avoid blocking, and so that the seal subsequently bonds when pressure is applied.

The plexifilamentary material can optionally be printed using a variety of printing techniques, including, but not limited to, offset lithography including four-color process sheet-fed offset lithography and heat-set web offset lithography, flexography (web or sheet), inkjet, screen printing (hand, automatic, and rotary), laser printing, and dot matrix printing, using standard inks and toners specific to each printing technique. Such printing can include, for example, name and information regarding the supplier of the hot melt composition, lot number, shipping and handling standards such as ANSI standards, shipping address, tracking numbers, instructions for reheating and use, warnings, barcodes, or any of a variety of text, graphics, indicia, or the like. This feature is a particular advantage over the expanded polymer containers described in the Background section because it is difficult to achieve high quality printing of the expanded polymer containers using standard inks and printing techniques. Rather, standard inks can bead up on the surface making printing illegible, and/or can degrade or eat away at the expanded polymer material. Additional labeling processes must be employed to label the expanded polymer containers in accordance with certain standard or regulations. The printability of the plexifilamentary material avoids the need for specialty printing processes, and/or labeling processes.

Figure 6:
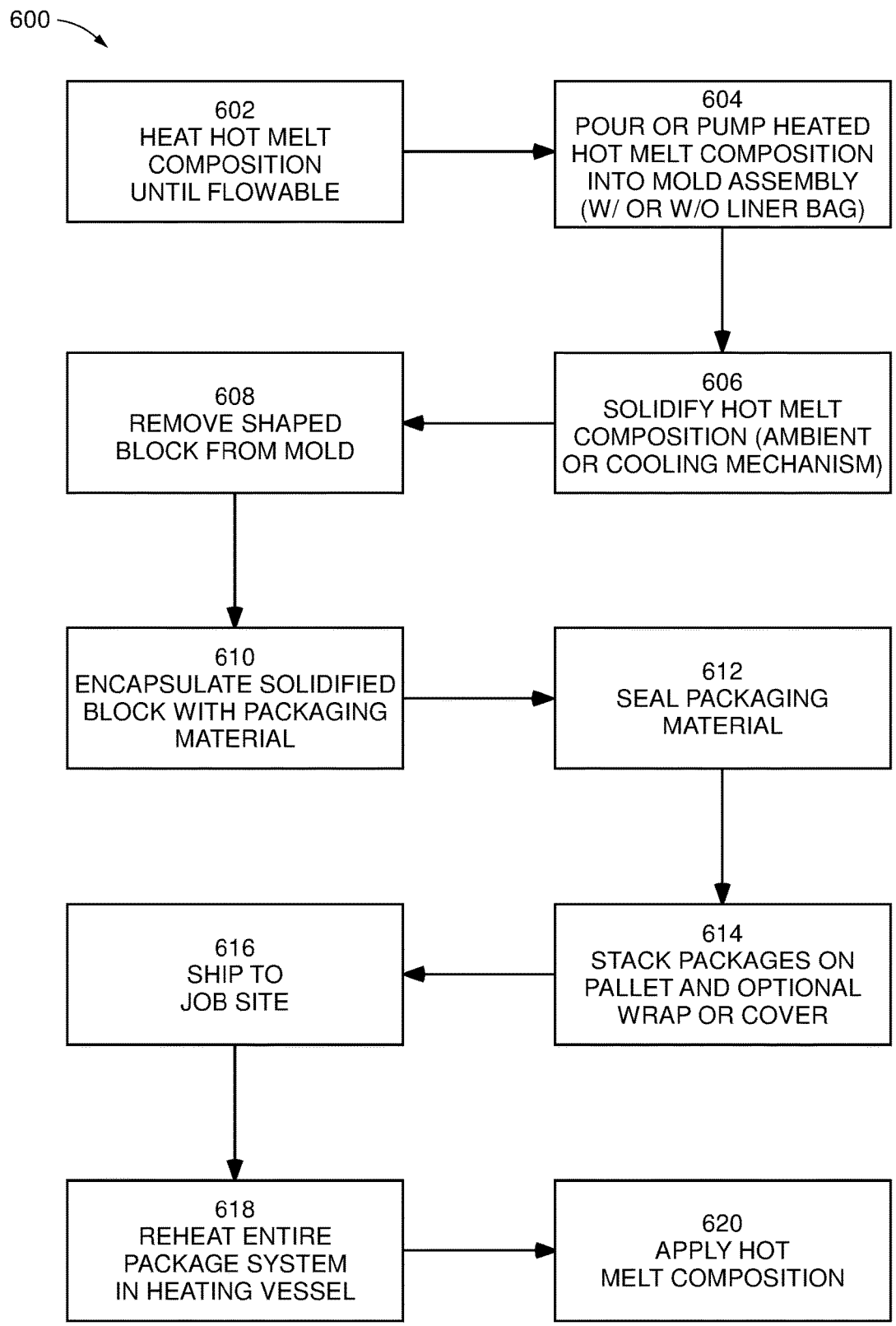
FIG. 6 is a process flow diagram for providing a consumable packaging system for hot melt compositions according to an embodiment of the invention.

Referring to FIG. 6, and method 600, to form a durable yet consumable package containing hot melt composition, such as packaged asphalt, the hot melt composition is first cast into slabs of material of a desired size. In one particular embodiment, and referring to FIG. 6, at 602, asphalt (or other hot melt composition) is heated until it flows, and at 604, it is cast into a mold assembly. Referring to FIG. 1, mold assembly 100 includes a mold 102 of any of a variety of desired shapes and/or sizes. In one particular embodiment, mold 102 comprises a cardboard box.

The asphalt or other hot melt composition 101 can be cast directly into mold 102, or as depicted in FIG. 1, mold 102 is lined with a liner sheet or bag 104, having a thickness of about 0.001 in (1 mil) to about 0.006 in (6 mils), and more particularly about 0.002 in (2 mils) to about 0.003 in (3 mils). Liner bag 104 can comprise a material having a higher melt temperature than the flowable hot melt composition when deposited into bag 104, and can have a melting point at or below the reheat temperature range for the hot melt composition. In one specific embodiment, liner bag 104 comprises a polypropylene bag having a thickness of about 2 mils.

Figure 2:
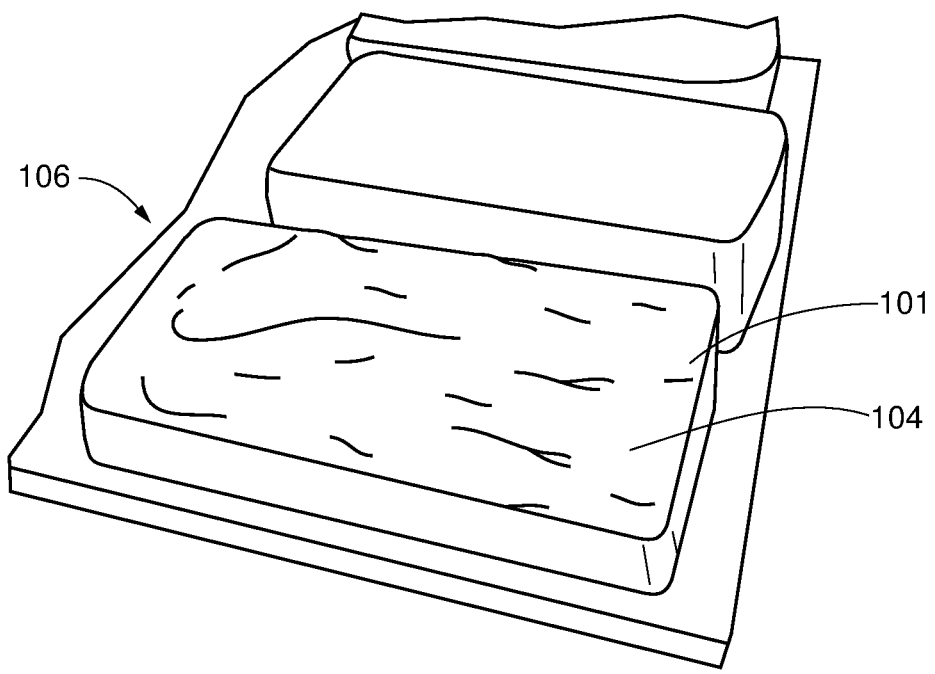
FIG. 2 is depicts a cast and cooled asphalt slab according to FIG. 1 and before packaging in a plexifilimentary olefin material.
Figure 3:
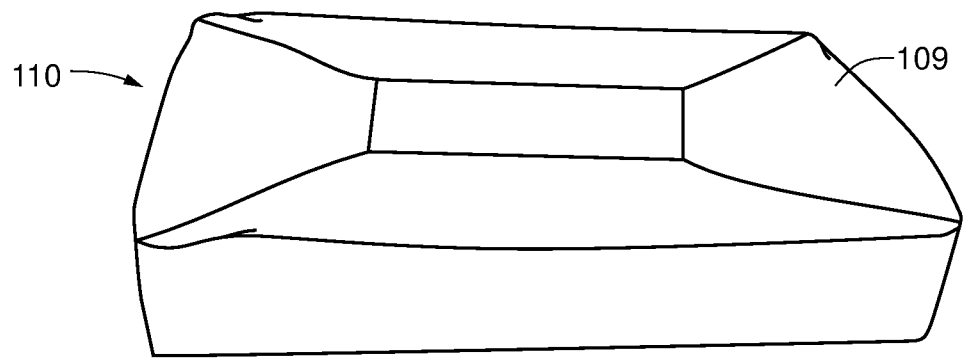
FIG. 3 depicts an asphalt slab packaged and sealed in a plexifilimentary olefin material according to an embodiment of the invention.

Referring back to FIG. 6, at 606, the cast hot melt composition is allowed to cool until solidified, and then removed from the mold at 608. As shown in FIG. 2, asphalt 101 is allowed to cool in liner bag 104, thereby forming slab 106. Slab 106 is then removed from mold 102. Referring back to FIG. 6, at 610, the formed slab is wrapped, either automatically or manually, with the packaging material and is subsequently sealed at 612 to form the packaging system. As shown in FIG. 3, packaging system 110 includes packaging material 108 encapsulating slab 106 (not shown).

In an alternative embodiment (not shown), sheets of packaging material (such as 36"×36" sheets) can be laid into a mold (with or without a liner bag), and the asphalt is cast onto the sheet in the mold. The asphalt is cast at a temperature below the melting temperature of the plexifilamentary material, or at a higher temperature in which the optional liner, such as a high density polyethylene liner or polypropylene, is incorporated. This optional liner melts at a higher temperature than the casting temperature of the asphalt. The plexifilamentary sheet is then wrapped, sealed by heat sealing, ultrasonic welding, adhesive, or other means either immediately, or upon cooling or solidification of the asphalt, to form a hot melt composition package.

In one particular embodiment of the invention (not shown), a slab of asphalt is wrapped with the plexifilamentary material using automated wrapping equipment known to one of ordinary skill in the art. One wrapping technique can include a wrap with a single seam, and each edge of each end being folded inwards to a single glue or adhesive joint, resembling a gift-wrapped package, for example. Another technique includes folding the ends into the package and then sealing the seam such that no glue joints are apparent on the ends, and the only glue joint on the package is along the seam. The glue joints and seams should be sufficiently sealed such that the asphalt, in the event it is flowable during storage or shipping, does not leak from the package.

Suitable adhesives or glues for the glue joints can include, for example, water-based adhesives, natural product adhesives based on starch, dextrin, casein, or animal byproducts, synthetic adhesives including water-based ethylene/vinyl acetate adhesives and polyurethanes, and hot melt adhesives.

Mold 102 is dimensioned to form the desired shape and size of the asphalt slab. In one non-limiting exemplary embodiment, each slab is approximately 12×18×3.5 inches, or alternatively 9×18×4.0 inches for maximum handleability by an end user. When asphalt is the hot melt composition, each slab is about 35 to about 25 pounds at these dimensions respectively. However, any of a variety of dimensions can be utilized depending on the end use. The desired dimensions can be dictated by, for example, but not limited to standard pallet size, desired stacking interlocking patterns, and desired number of packages per pallet.

In an alternative embodiment of the invention, the asphalt is cast or extruded into a slab. Upon cooling, the slab is cut or otherwise converted into a plurality of blocks. The blocks are then placed on a web or discrete sheets of the packaging material for subsequent wrapping and sealing.

In yet another embodiment of the invention (not shown), the hot melt composition or asphalt is introduced at an elevated temperature, into a pelletizer. The pelletizer forms a plurality of discrete pellets as the asphalt cools. The pellets are then introduced into a pouch, bag, supersack, or other consumable container comprising the packaging material (with or without an optional liner and/or optional liner bag) as described above. The pellets are readily remelted more quickly at a job site than the asphalt slab due to the increased surface area of the plurality of pellets. In one particular embodiment, an underwater pelletizing process is used in which the hot melt composition is introduced into a cool water bath upon its ejection from the pelletizer such that the pellets solidify immediately.

In yet another embodiment of the invention (not shown), a fully or mostly automated system is used for containerization of the hot melt material. Such system can comprise, for example, a form, fill and seal system. In this system, a supply of the plexifilamentary material in the form of a web moves downweb where seals are formed by heat sealing, ultrasonic welding, or the like along various edges, and then the web is cut thereby forming a bag or pouch with one unsealed edge. A metered supply of the hot melt material, such as a hopper or feeder in the case of solid asphalt, or a nozzle in the form of liquid asphalt, is introduced into the open end of the bag or pouch to at least partially fill the bag or pouch with the desired amount of product. The final edge of the bag or pouch is then completely sealed using heat sealing, adhesive, ultrasonic welding or the like.

Figure 4:
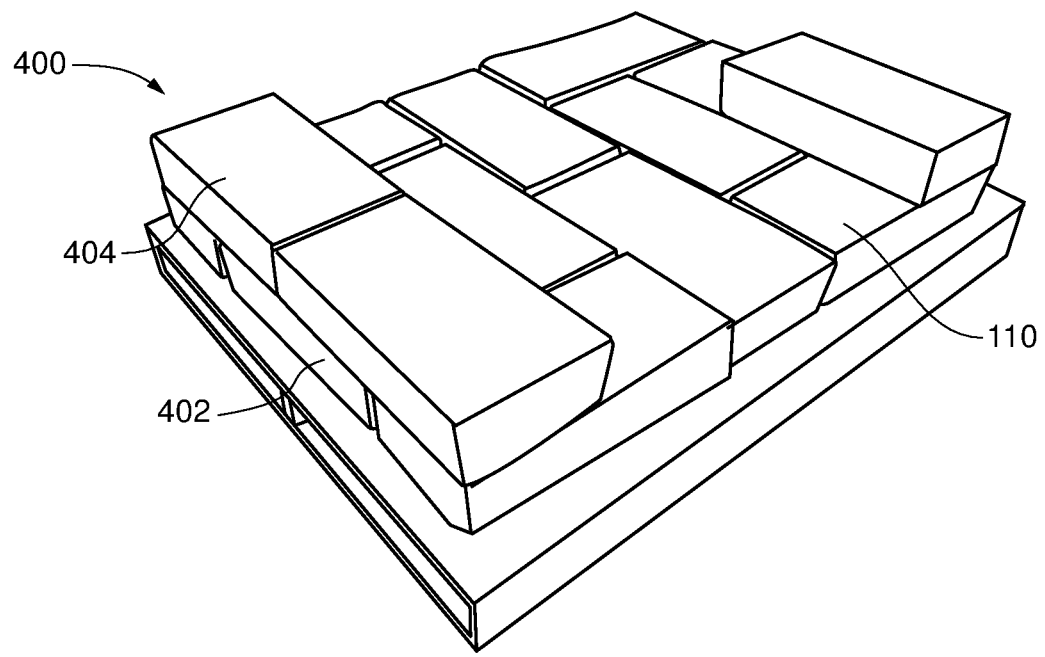
FIG. 4 is depicts a layer and a portion of a second layer of packaged asphalt slabs packaged in plexifilamentary olefin material stacked on a standard pallet according to an embodiment of the invention.

Referring back to FIG. 6, at 614, a plurality of packages 110 is stacked on a pallet, or other bulk container. Referring to FIG. 4, a partially stacked pallet 400 includes a first layer 402 comprising a plurality of hot melt composition packages 110 layered on a pallet 404. A second layer 404 is then started in an opposite direction to provide optimum stacking stability, such that lower layers provide structural support to the adjacent layer above. In this particular non-limiting embodiment, ten packages 110 are incorporated into a layer. In another embodiment not shown, seven packages are incorporated into a layer, such as by a 2, 2, 3 pattern. Any of a variety of layer configurations can be incorporated, depending on the size and weight limitations of the pallet.

Figure 5:
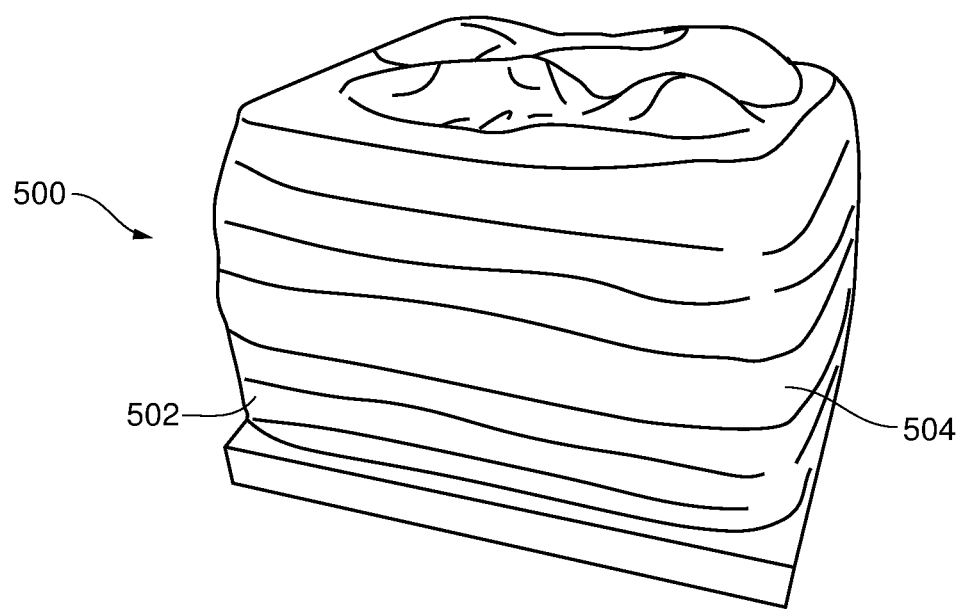
FIG. 5 is a pallet of stacked packaged asphalt slabs secured with an outer tension wrapping according to an embodiment of the invention prior to transport.

Referring to FIG. 5, a stacked pallet 500 includes a plurality of layers 502 of packages. In one particular non-limiting embodiment, stacked pallet 500 is stacked eight layers high, each layer having ten packages as described above, for a total of about 2000 pounds per pallet. Each stacked pallet typically does not exceed about 36 inches in height which is significantly less than the pallet heights of either the box and liner packaging type or the expanded polymer container described in the Background section. Therefore, the packing density of the hot melt composition is much higher than that of many of the prior art systems.

Referring to FIG. 5, stacked pallet 500 includes a reinforcing wrap 504 such as a stretch or shrink wrap, to provide additional stability to stacked pallet 500. Additionally or alternatively, at least a portion of stacked pallet 500 can be wrapped with a reinforcing strip of plexifilamentary material along the bottom layers. For example, the strip can cover the interface between the pallet and the first layer, and can cover a portion of the first layer, thereby creating light tension at the bottom of the stack.

In an alternative embodiment of the invention, a sheet of plexifilamentary material is used as low tension wrapping instead of shrink wrap. The stack including the wrap is entirely consumable at the job site. In yet another alternative embodiment, the asphalt is instead packaged in standard polyethylene or polypropylene bags and stacked, and is then secured by a low tension wrapping of plexifilamentary material along the perimeter of the stack, thereby reducing the cost of the individual packages, without compromising many of the benefits described above.

Referring to FIG. 6, at 616, the stacked pallet is shipped to a job site, after optional storage and transport. Referring back to FIG. 5, stacked pallet 500, due to the durability and stability of the plexifilamentary material, can be stored for a significant period of time while experiencing variations in pressure and temperature without significant deformation or catastrophic failure of stacked pallet 500 and/or individual packages 110. As illustrated in FIG. 5, stacked pallet 500 can be stored and/or transported for thousands of miles in a variety of environmental conditions without significant deformation or catastrophic failure of stacked pallet 500 and/or individual packages 110.

Once at that job site, and referring back to FIG. 6, one or more packages from the pallet are introduced into a heating vessel or melter at 618. The heating vessel heats the hot melt composition to a suitable reheat temperature such that it is molten or otherwise ready for use. The reheat temperature is sufficient to not only liquefy or melt the hot melt composition, but also is at or above the melting temperature of the packaging material, and any optional liners (e.g. liner or liner bag), such that the packaging material and optional liner bag is incorporated into the hot melt composition without negatively or significantly impacting the melting and/or application properties of the hot melt composition itself.

The packaging systems, including the plexifilamentary material described in the above description, provides sufficient stability and durability such that asphalt, or other sealants or hot melt materials, can be packaged within without the need for an additional protective outer container or box, therefore saving time and cost when handling and shipping such materials. Automated processes that were not possible with the prior art systems can also be used in the containerization process due to the durability of the material. Furthermore, the material protects the asphalt from damage, such as holes, tearing, etc. due to transport and handling. The material also melts at relatively low temperatures, such as 250-275° F., such that it is readily meltable at the job site. Upon melting, the material essentially "disappears" into the molten asphalt such that it does not negatively affect meltability or other properties of the asphalt composition, and is virtually unnoticeable.

The enhanced strength and integrity of the packaging materials described herein, and including the flash spun bonded plexifilamentary material, allows equal or greater tensile strengths, yield strengths, and puncture resistances to be ascertained at significantly less material thicknesses and material weights such that an outer non-consumable container is not required. A variety of tests were performed on different materials of both the prior art and embodiments of the invention, as set forth below.

Table 1 below compares the yield strength of a nonwoven spun bonded polypropylene according to an embodiment of the invention, and a nonwoven flash spun bonded high density polyethylene (e.g. Tyvek®) according to another embodiment of the invention to standard LDPE films at various thicknesses. The samples were measured using ASTM D412 (room temperature) using a dumbbell shaped sample and a tensile tester.

TABLE 1

Yield Strength of Various Materials

| | Material | | | | |
|---|---|---|---|---|---|
| | Spun bonded PP | Spun bonded HDPE | 0.003 LDPE | 0.006 LDPE | 0.012 LDPE |
| Thickness | 0.009 in | 0.006 in | 0.003 in | 0.006 in | 0.012 in |
| Weight | 3.0 oz/y$^2$ | 1.6 oz/y$^2$ | 2.0 oz/y$^2$ | 4.2 oz/y$^2$ | 8.5 oz/y$^2$ |
| Strength (per lineal inch of width) | 18 lbs. | 24 lbs. | 4 lbs. | 8 lbs. | 17 lbs. |

This table shows that spun bonded HDPE has superior yield strength at only 6 mils in thickness. It is also much lighter than the standard LDPEs. The table shows that when thickness of standard, non-fiber-reinforced LDPE is doubled, the yield strength is still significantly less than the spun bonded HDPE material, and the weight is over five times that of the spun bonded HDPE. In order to obtain similar strength to that of the spun bonded HDPE, the LDPE becomes quickly too thick and/or too heavy. The LDPE becomes unworkable as it creates excess plastic material, thereby creating melting and material property and handling problems.

Table 2 below compares the puncture resistance of a nonwoven flash spun bonded high density polyethylene (i.e. Tyvek®) according to an embodiment of the invention to standard LDPE films at various thicknesses, and the multilayered bag as described in the Background section. The samples were measured using ASTM E 154 Puncture Test, which consists of clamping a sheet of material in a fixture or frame having a center opening of 6 in×6 in, placing the sample in a test apparatus, and then puncturing the sample with a one inch diameter steel probe, at a rate on ¼ inch per minute. The load is measured to break.

TABLE 2

Puncture Resistance of Various Materials

| | Material | | | | |
|---|---|---|---|---|---|
| | Spun bonded HDPE | 0.003 LDPE | 0.006 LDPE | 0.012 LDPE | Multilayered bag |
| Weight (oz/y$^2$) | 1.6 | 2.1 | 4.2 | 8.5 | 3.0 (fabric) |
| Puncture result | 94 lb | 20 lb | 38 lb | 80 lb | 91 lab |

The results show that the puncture resistance of the multilayered bag having a heat set spun bonded polypropylene fabric intermediate layer (3.0 oz per square yard) is similar to the much lighter spun bonded HDPE material. This spun bonded HDPE material provides similar strength to the multilayered bag, but is also entirely consumable or meltable such that waste product is not generated at the job site. Furthermore, an approximate equivalent in weight of LDPE to the spun bonded HDPE material is a sample of LDPE having a thickness of approximately 0.003 inch (3 mils) thick. At this thickness, LDPE has a much lower puncture resistance of 20 lb. Even at 0.012 inch (12 mils) thick, standard, non-fibrous LDPE is still not quite as strong as the spun bonded HDPE material. To reach the spun bonded HDPE material puncture resistance result, it is estimated that the LDPE would need to be approximately 0.014 inch (14 mils) thick, which creates excess plastic material, thereby creating melting and material property and handling problems.

One should also note, for comparison, that a typical puncture result for a dry cardboard box is approximately 166 lb. However, this result is impacted by moisture and humidity. Even if the cardboard becomes slightly damp, the puncture result could be negatively affected, and may even be decreased to 0 in worst case scenarios. The packaging materials according to embodiments of the invention, on the other hand, general exhibit little to no moisture effect, and their puncture results remain the same under any moisture and humidity environments.

The thinner, stronger packaging materials according to embodiments of the invention, are not only easier to handle and more flexible than the films of the prior art, but also account for much less of the total makeup of the packaging system, thereby having virtually unnoticeable impact, or at least not detrimental impact, on the melting properties of the asphalt or hot melt composition in contains. As shown in Table 3 below, the packaging material, and in particularly, the flash spun-bonded HDPE packaging material, make up very little of the overall asphalt or other hot melt composition, particularly compared to the foam container described in the Background section.

TABLE 3

Total wt % of consumable package in asphalt composition

| Packaging Material | Wt of asphalt composition block | Wt of packaging material | Approx. wt % of packaging material in total melted composition |
|---|---|---|---|
| Spun bonded HDPE (alone) | 25 lbs | 1.1 oz | 0.3% |
| Spun bonded HDPE with 0.0015 in polypropylene liner bag | 25 lbs | 2.0 oz (1.1 oz HDPE + 0.9 oz PP) | 0.5% (0.3% HDPE + 0.2% PP) |
| Polystyrene foam container (Prior art) | 25 lbs | 6 oz. | 1.5% |

Table 4 below includes melting properties of the packaging system of the present invention when the packaging material comprises the flash spun-bonded HDPE packaging material. As shown, the packaging material has little to no negative effect on the melting properties of the asphalt composition. The asphalt composition is a sealant product meeting ASTM D6690, Type 2, specifications (specifications listed in last column).

TABLE 4

Melting properties of ASTM D6690, Type 2 hot melt composition

| | Asphalt composition alone (no overwrap) | Asphalt with Tyvek ® overwrap (including PP liner bag) | Asphalt with 0.012 in LDPE sheet overwrap | Asphalt with 0.010 in PP sheet overwrap | Specification (ASTM D6690, Type 2) |
|---|---|---|---|---|---|
| Cone penetration | 85 | 78 | 60 | 56 | 90 Max |
| Softening point | 188 F. | 186 F. | 186 F. | 188 F. | 176 Min |
| Resilience | 74% | 72% | 60% | 56% | 60 Min |
| Bond, −20 F., 50% ext. | Pass 3 cycles | Pass 3 cycles | Fail 3 cycles | Fail 3 cycles | Pass 3 cycles |
| Puncture result | N/A | 94 lb | 80 lb | 89 lb | N/A |

As seen in Table 4, the properties of the asphalt with Tyvek® overwrap are slightly effected, i.e. stiffened (i.e. penetration is slightly lower), but the asphalt composition still passes specification. The standard, non-fibrous LDPE and PP films, on the other hand, at thicknesses sufficient to produce puncture resistance similar to the Tyvek® overwrap, significantly (and negatively) affect the overall hot melt composition. Specifically, as a result of the films being thicker, the asphalt composition is stiffer (penetration is significantly less), resilience drops to at or below the minimum, and the low temperature bond fails.

Table 5 compares the melt properties of a stiffer hot melt composition than the asphalt composition of Table 4 known as crack filler. Similar to Table 4, the composition with Tyvek® overwrap has little or no negative effect on the melting properties compared to the original composition with no overwrap.

TABLE 5

Melting properties of crack filler hot melt composition

| | Filler composition alone (no overwrap) | Filler composition with Tyvek ® overwrap (including PP liner bag) | Specification (Crack filler composition) |
|---|---|---|---|
| Cone penetration | 28 | 27 | 20-40 Max |
| Softening point | 219 F. | 216 F. | 210 F. Min |
| Resilience | 49% | 45% | 30% Min |
| Flexibility at 30 F. | Pass | Pass | Pass |
| Flow at 140 F. | 0 mm | 0 mm | 3 mm max |

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention can comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

What is claimed is:

1. A method of providing an entirely consumable packaging system for a hot melt composition, the method comprising:
    providing a block of hot melt composition, wherein the hot melt composition comprises asphalt;
    providing a fiber- or filament-reinforced packaging material comprising a nonwoven, plexifilamentary polyolefin material;
    encapsulating the block with the packaging material; and sealing the packaging material such that the block is sealed within,
    wherein a melting temperature of the packaging material is about equal to or less than a reheat temperature of the hot melt composition such that the packaging material is entirely consumed into the hot melt composition when heated to the reheat temperature, and wherein the packaging material comprises less than 1.5 weight percent of the system and wherein a cone penetration stiffness measurement of the hot melt composition changes less than 10% when the packaging material is entirely consumed into the hot melt composition.

2. The method of claim 1, wherein before encapsulating the block with the packaging material, the method further comprises:

heating the hot melt composition to a softening temperature such that the hot melt composition is flowable, molten, or pumpable;

depositing the heated hot melt composition into a mold; and cooling the hot melt composition until the hot melt composition is substantially solid thereby forming the block before encapsulating the block with the packaging material.

3. The method of claim 2, wherein the packaging material further comprises a polymeric liner bag having a bag wall thickness of about 1 to about 6 mils, and wherein a melting temperature of the polymeric liner bag material is greater than the softening temperature of the hot melt composition.

4. The method of claim 1, wherein providing a hot melt composition comprises:

heating the hot melt composition to a softening temperature such that the hot melt composition is flowable, molten, or pumpable;

extruding the hot melt composition;

cooling the extruded hot melt composition until the hot melt composition is a substantially solid; and cutting the extruded hot melt composition into a plurality of blocks to be individually encapsulated.

5. The method of claim 1, wherein the asphalt has a penetration grade in a range of about 10 to about 300, and a softening point of about 250 degrees Fahrenheit or less.

6. The method of claim 1, wherein the nonwoven, plexifilamentary material comprises a flash spun-bonded high density polyethylene.

7. The method of claim 1, further comprising:

shipping the entirely consumable packaging system containing the hot melt composition to a job site; and heating the packaging system containing the hot melt composition in a heating apparatus to the reheat temperature of the hot melt composition for application.

8. The method of claim 1, wherein the packaging material comprises 0.5 weight percent or less of the system.

* * * * *